May 30, 1972 R. L. NELSON ET AL 3,666,485
APPARATUS FOR MAKING FOOD ITEM
Original Filed April 2, 1964 4 Sheets-Sheet 1

INVENTORS
RICHARD L. NELSON
BY WALTER P. NELSON

Roy A. Plant
ATTORNEY

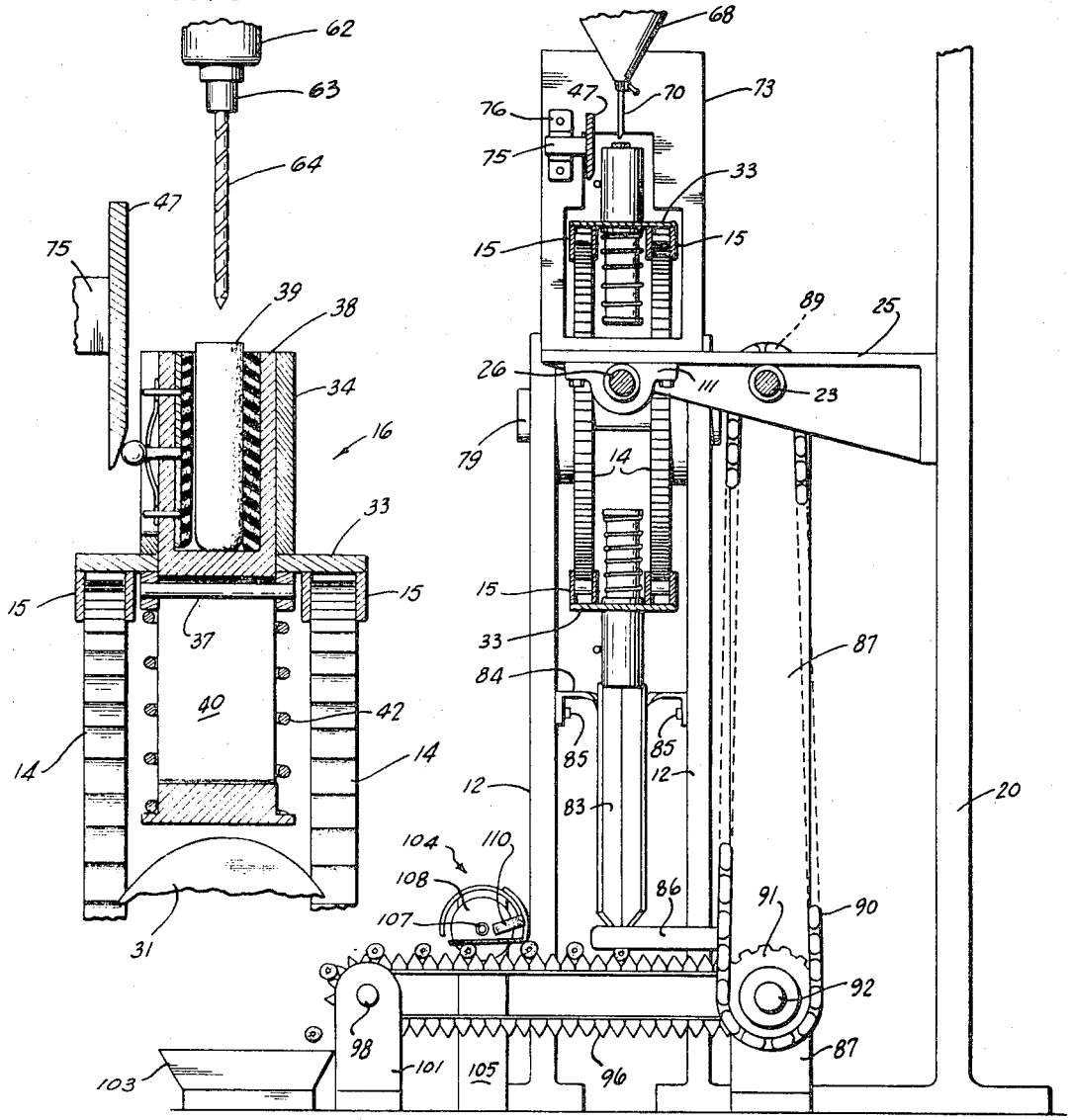
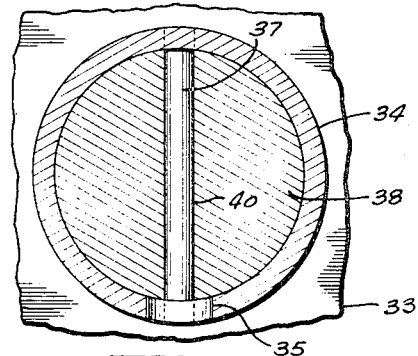

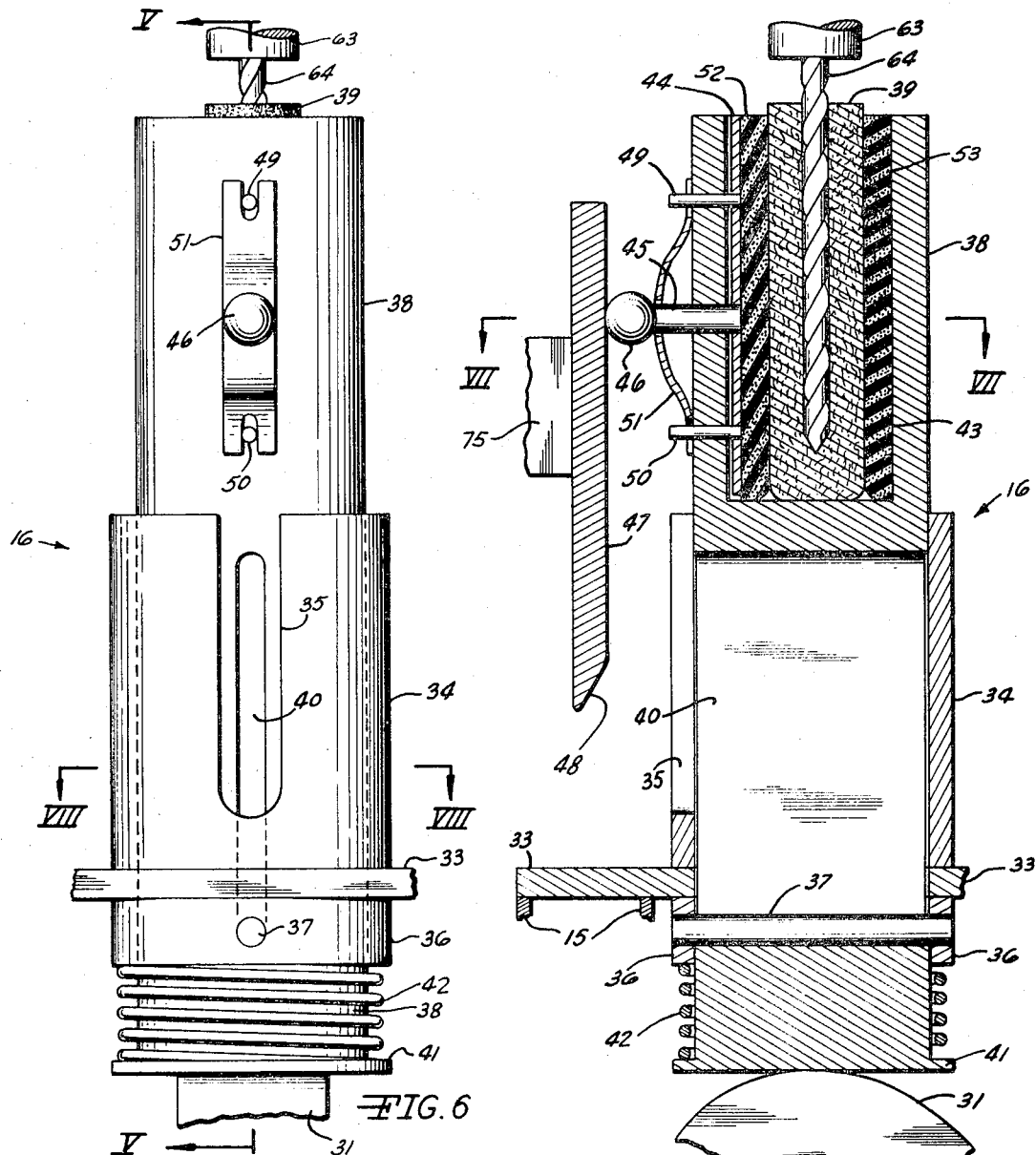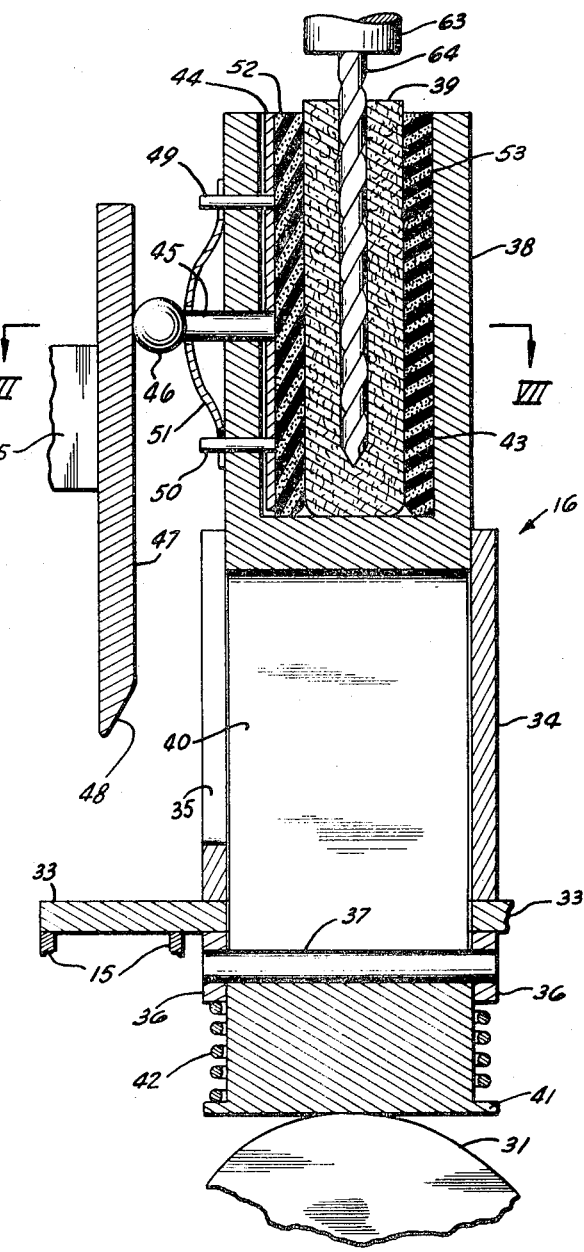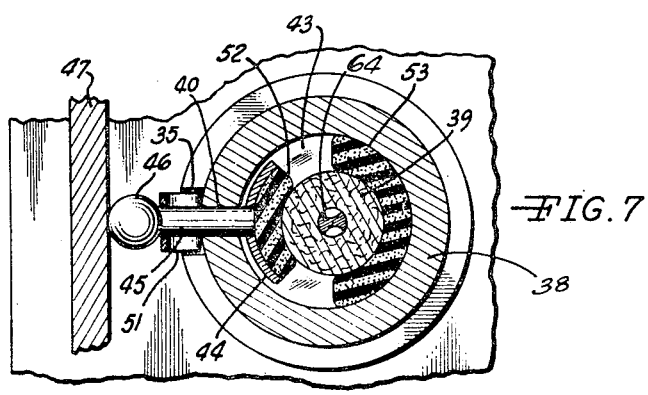

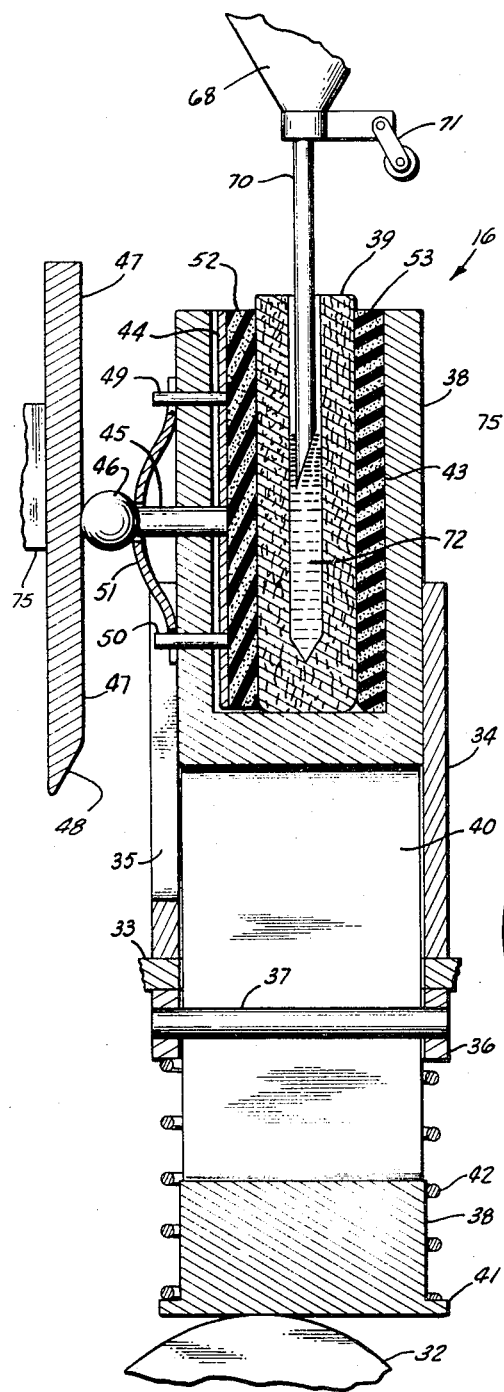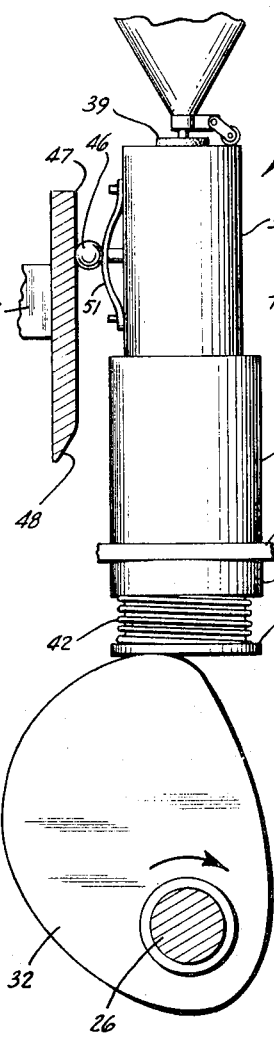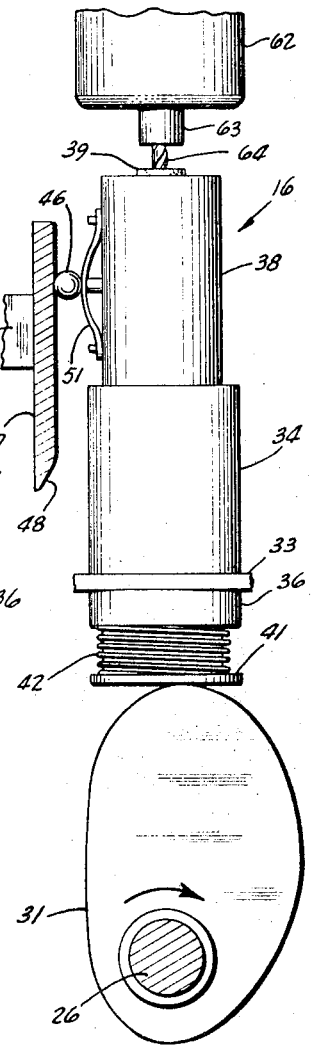

United States Patent Office 3,666,485
Patented May 30, 1972

---

3,666,485
APPARATUS FOR MAKING FOOD ITEM
Richard L. Nelson, 669 Riverside Drive, and Walter P. Nelson, 154 Fuller Road, both of Battle Creek, Mich. 49015
Continuation of application Ser. No. 793,220, Jan. 10, 1969, now Patent No. 3,538,840, which is a continuation of application Ser. No. 650,137, June 29, 1967, which in turn is a continuation of application Ser. No. 356,874, Apr. 2, 1964. This application Sept. 21, 1970, Ser. No. 73,807
Int. Cl. A23g 3/00
U.S. Cl. 99—88                5 Claims

---

ABSTRACT OF THE DISCLOSURE

A filled edible product is described, as for example a breadstick which is at least initially brittle, substantially unyielding and incompressible. The product is filled by first inserting in a holding means which contains a resilient product support member for resiliently gripping and supporting the stick, after which an elongated cavity is formed in the product and the cavity subsequently filled with an extrudable material such as cheese, whipped cream, custard, fruit preserves and jelly. The invention also includes an apparatus for drilling while properly supporting the product and subsequently filling the cavity formed with the extrudable material.

---

BACKGROUND OF THE INVENTION

This application is a continuation of our pending application Ser. No. 793,220, filed Jan. 10, 1969, now issued as U.S. Pat. No. 3,538,840, which in turn is a continuation of our application Ser. No. 650,137, filed June 29, 1967, which in turn was a continuation of our application Ser. No. 356,874, filed Apr. 2, 1964, the latter two both now abandoned.

The present invention relates broadly to the field of article filling, and in its specific phases to a filled bread stick and the method and apparatus for making same.

It is well-known practice to pierce a food item having a relatively open and porous interior, such as a cream puff or doughnut of pillow shape, and directly inject into such food item through the piercing member, a thick but flowable filling such as whipped cream, custard, fruit preserves, and jelly. The filling of hollow ice cream cone type items by various filling procedures, such as with soft ice cream like material flowing from a faucet has also been proposed. Such procedures do not lend themselves to the filling of relatively solid items, and especially the solid and relatively brittle, stick-like, hard crust items, and it was a recognition of the marketing possibilities of such items and a special method and apparatus for producing them, not commercially available, which led to the conception and development of the present invention.

SUMMARY OF THE INVENTION

Accordingly, among the objects of the present invention is the provision of a new product in the form of an initially solid, relatively brittle, stick-line, crust-covered product which has been subsequently mechanically hollowed and filled with a suitable filler, and the method and apparatus for producing such product.

Another object of the present invention is the provision of a new item formed from a manufactured initially solid, relatively brittle, stick-like item, and a suitable filling material.

Another object of the present invention is to provide a new food product in the form of a filled bread stick.

Another object of the present invention is to provide a new method of handling and filling a manufactured item which is of initially solid, relatively brittle, stick-like form.

Another object of the present invention is to provide a new method of handling and filling a manufactured initially solid, relatively brittle item, such as a bread stick, wherein the sides of same are resiliently supported with mild holding pressure while the bread stick is being mechanically hollowed ready to receive a suitable filling.

Another object of the present invention is to provide a new method of handling and filling a food item such as a bread stick wherein the end of same is severed and the sides of same are resiliently supported with mild holding pressure while the bread stick is hollowed substantially full length from the severed end ready for the reception of a suitable filling.

Another object of the present invention is to provide a new method of handling and filling a bread stick or the like comprising cutting it to length, resiliently holding the so-cut bread stick with mild pressure while exposing the cut end of same, hollowing it substantially full length from the cut end, and then filling same with a suitable extrudable filler with the filling starting from the bottom portion of the hollow in said bread stick.

Another object of this invention is to provide an apparatus which will receive an initially solid, relatively brittle, stick-like item, process, fill and deliver same ready for use or packaging.

Another object of this invention is to provide an apparatus which will receive a manufactured, initially solid, relatively brittle item, such as a bread stick, and resiliently support its sides and hold same with mild pressure while it is hollowed and filled, before it is delivered ready for use, cutting, and/or packaging.

Another object of this invention is to provide an apparatus which will cut a bread stick to length, drill it substantially from the cut end to the other, fill same from the inside of said drilled opening, starting adjacent the bottom of same, with a suitable thick but extrudable filling material, and deliver same for further processing, using, or packaging.

A further object of this invention is to provide an apparatus having a series of hollow members for receiving and resiliently holding elongated, solid members, such as bread sticks, and which will automatically process and deliver them as filled bread sticks.

A further object of this invention is to provide an apparatus having a series of hollow members for receiving and holding elongated, solid members, such as bread sticks, while they are being cut to length, said hollow members which carry said bread sticks being bodily raised and lowered by timed portions of the apparatus for both drilling and later filling said bread sticks before the latter are released and emptied from said hollow members.

A further object of this invention is to provide an intermittent motion apparatus having a series of hollow members mounted on a continuous carrier which intermittently moves forward and stops, said hollow members being adapted to receive and hold elongated, solid members to be processed, such as bread sticks, other parts of said apparatus being timed in unison with said intermittent motion of said carrier for cutting said bread sticks to length, drilling, and then filling them before delivering the filled bread sticks from said hollow members.

Still further objects and advantages of this invention will appear as the description proceeds.

To the accomplishment of the foregoing and related ends, the invention, then, consists of the products, methods and means hereinafter fully described and particularly pointed out in the claims, the annexed drawings and the following description setting forth in detail certain products, means and modes of carrying out the invention, such disclosed products and the means and modes for making same illustrating, however, but one of the various ways in which the principle of the invention may be used.

BRIEF DESCRIPTION OF THE DRAWINGS

In the annexed drawings:

FIG. 3 shows an enlarged, fragmentary, sectional view at the drilling station with the item to be drilled being in position to be elevated and drilled.

FIG. 4 shows a sectional view as taken along line IV—IV of FIG. 2, looking in the direction of the arrows.

FIG. 5 shows an enlarged sectional view, with the carrier in elevated position at the end of the drilling operation, as taken along line V—V of FIG. 6, looking in the direction of the arrows.

FIG. 6 shows an enlarged elevational view of part of the drilling station apparatus in elevated position.

FIG. 7 shows an enlarged, fragmentary, sectional view as taken along line VII—VII of FIG. 5, looking in the direction of the arrows.

FIG. 8 shows an enlarged, fragmentary sectional view as taken along line VIII—VIII of FIG. 6, looking in the direction of the arrows.

FIGS. 9 and 10 show the simultaneous positions of the filling and drilling stations at the start of the filling operation and the end of the drilling operation, both stations being actuated by cams mounted on the same cam shaft.

FIG. 11 shows an enlarged, fragmentary, sectional view of the filling station with the article carrier being lowered and the filling of the article being about half completed.

DESCRIPTION OF THE SPECIFIC EMBODIMENT

Figure 1:
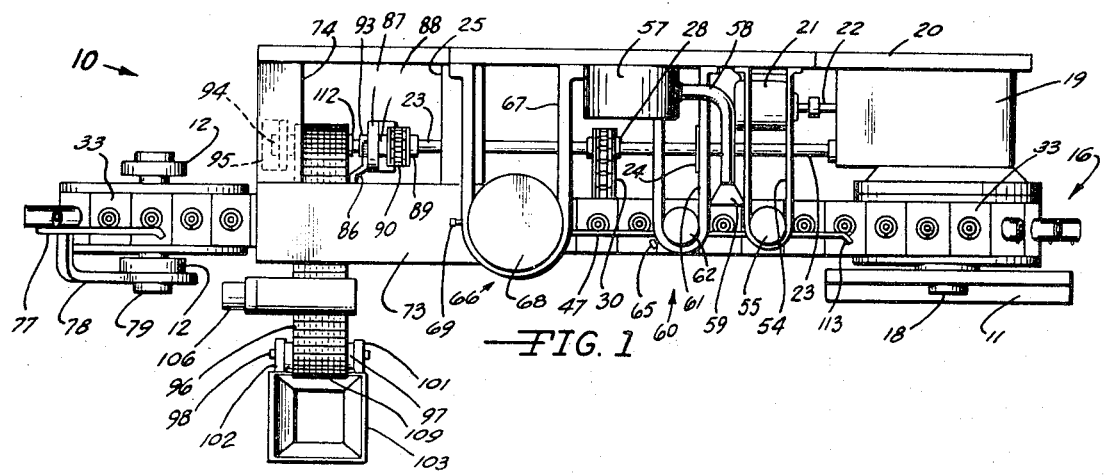
FIG. 1 shows a top view of a preferred form of the present invention.
Figure 2:
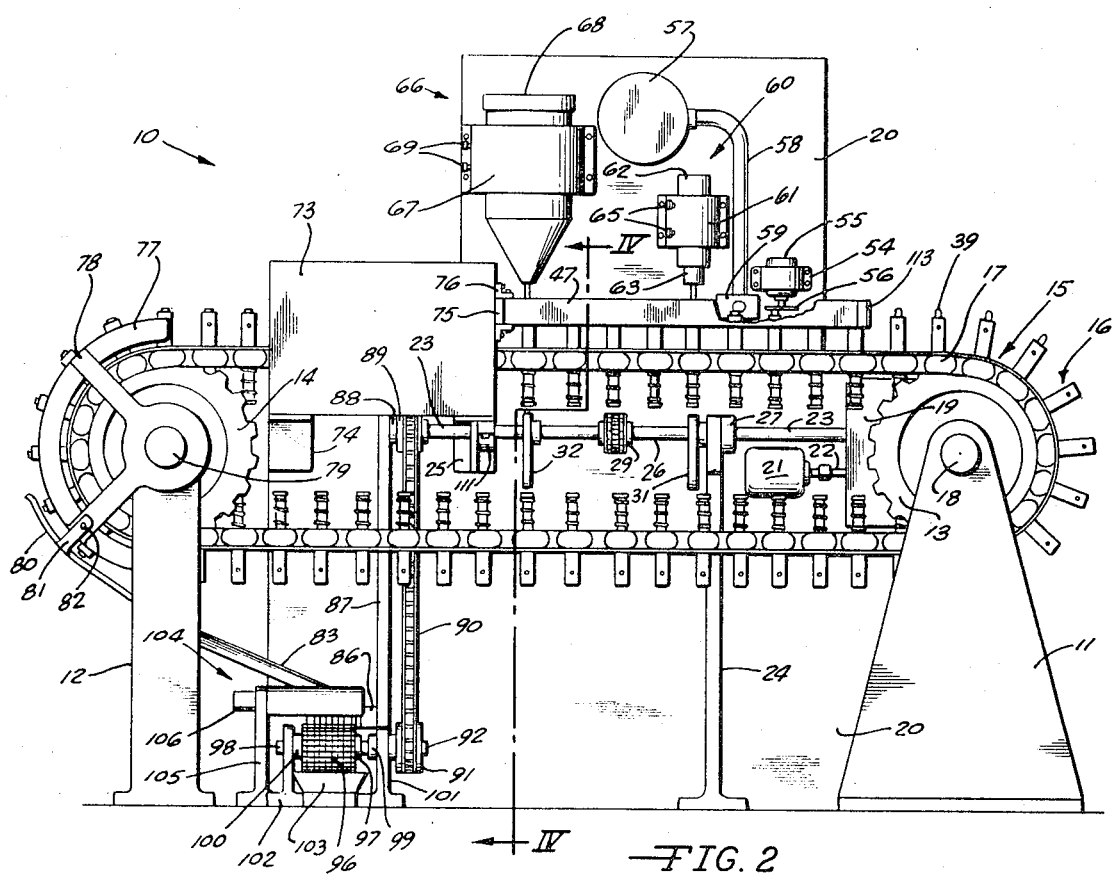
FIG. 2 shows a front elevational view of the apparatus illustrated in FIG. 1.

Referring more particularly to FIGS. 1, 2 and 4 of the drawings it will be noted that the filling machine 10 has double pedestals 11 and 12 carrying spaced apart double sprockets 13 and 14, respectively, on which are mounted parallel chains 15. These parallel chains 15 carry thereon in uniformly spaced positions a series of item receiving assemblies 16, FIG. 6 conventionally anchored to the links 17 of said chains, FIG. 2, as diagrammatically shown in section of FIGS. 3 and 4. Double sprockets 13 are mounted on shaft 18 which, in turn, extends into the indexing unit 19, FIG. 1, supported on back panel 20, FIGS. 1, 2 and 4. A single electric motor 21 mounted on back panel 20 drives the indexing unit 19 through drive shaft 22.

A drive shaft 23, FIGS. 1, 2 and 4, extends out of the indexing unit 19 and is conventionally supported on a pedestal 24 and shelf bracket 25. Substantially centered between parallel chains 15 is a cam shaft 26, FIG. 4, which is conventionally supported on a bearing 111 on shelf bracket 25, FIG. 2, and bearing 27 of pedestal 24. Drive shaft 23 has a sprocket 28 and cam shaft 26 likewise has a sprocket 29, with those sprockets connected for rotation of shafts 23 and 26 in unison by chain 30. Cam shaft 26 carries cams 31 and 32, the use of which will be hereinafter described.

The item receiving assemblies 16, FIGS. 5 and 6, are individually mounted on, and each extends through, a mounting plates 33 which, in turn, is conventionally fastened to the chain links 17 by welding, brazing, or the like. This assembly 16 has a tubular guide member 34 provided with a side slot 35. Fastened in conventional manner as by welding, brazing, or the like to the underside of mounting plate 33 is a ring member 36 which is concentric with guide member 34 and preferably has a like inside diameter. Extending through said ring member 36 is a cross pin 37, the use of which will be hereinafter described.

Slidably fitting tubular guide member 34 is a carrier 38 for the goods 39 to be processed. This carrier 38 is provided with an axially elongated slot 40 slidably receiving cross pin 37 which limits said carriers 38 to straight line endwise movement. Below said elongated slot 40 and, substantially at the bottom end of said carrier 38, same is provided with an outurned flange 41, FIG. 5, which forms a support for compression spring 42, the upper end of which preferably bears against the bottom edge of ring member 36. This spring 42 applies, at all times, a downward pressure on carrier 38 to move the open end portion of same into tubular guide member 34 for a purpose to be hereinafter described. Cam 31 bears against the lower end of carrier 38, when the latter is being actuated at the drilling station, with the two being held in contact with each other under the influence of compression spring 42 so that for each revolution of cam shaft 26 the carrier 38 in contact with same moves through a complete cycle of its up and down travel.

Carrier 38 is provided with an open top longitudinal cavity or recess 43, FIGS. 5, 7 and 11, in which is mounted for sidewise in and out movement, an arcuate member 44, mounted on a pin 45 having a rounded outer end 46 adapted to ride on a stationary cam plate 47 having a tapered lower edge 48 for the endwise actuation of pin 45 as carrier 38 moves through the start of its up and the end of its down cycle of movement in accordance with one form of this invention. Guide pins 49 and 50 are also anchored to arcuate member 44, the same as pin 45, with carrier 38 being provided with suitable openings for the close but free sliding fit of all of said pins. A leaf spring 51 fits under the rounded end member 46 and has its ends bifurcated to fit over pins 49 and 50, FIG. 6, for stability of the assembly and the application of outwarded pressure on arcuate member 44 at all times when the leaf spring is not compressed due to the rounded end 46 of pin 45 riding on stationary cam plate 47. The inner face of arcuate member 44 is preferably concentric with and extends substantially 90° around the inner face of longitudinal recess 43, and has on its inner face a resilient member 52 preferably formed from sponge rubber, or the like. Directly opposite to resilient member 52 is another similar resilient member 53, which preferably extends substantially 180° around the inner face of recess 43. This makes possible the firm side gripping of the goods 39 for drilling or the like whenever the rounded outer end 46 of pin 45 is in contact with stationary cam plate 47. It is thus to be seen that when carrier 38 is lowered so that the rounded outer end 46 of pin 45 is out of contact with stationary cam plate 47, leaf spring 51 will cause arcuate member 44 with its resilient face member 52 to move outward so that the goods item 39 can be freely dropped into the longitudinal cavity or recess 43, and then as carrier 38 is moved upwardly by cam 31 to bring the rounded outer end 46 of pin 45 into contact with stationary cam plate 47, the resilient member 52 is moved inward to grip and hold the goods item 39 while same is being processed.

Where the goods to be processed are in the form of bread sticks, such bread sticks will be produced in predetermined lengths and, as usual, will be relatively brittle and covered with a relatively hard crust all over including the relatively round ends of same. To drill through the crust covered end of such relatively brittle bread sticks and lengthwise of same, has been found to frequently cause undesirable breakage of the bread sticks. To overcome this the assembly 10 is provided with bracket 54, FIGS. 1 and 2, conventionally mounted on back panel 20, and carrying on its outer end a vertically mounted motor 55, anchored in place for vertical adjustment, as by set screws (not shown), said motor 55 having a rotary saw 56 mounted on the lower end of same. This rotary saw is so positioned that it will cut off the upper end of the bread stick as it is carried past the saw while in carrier 38. This produces a flat easily drillable end as shown in FIG. 3.

The sawing of the upper end of the bread stick produces sawdust, and in order to collect at least a major portion of same the assembly 10, FIGS. 1 and 2, is provided with a source of vacuum or a vacuum producing assembly 57 having an inlet pipe 58 extending to a suction nozzle 59 in position to receive the sawdust as produced. This sawdust is conventionally delivered to a point of disposal, which is not a part of the present invention or shown as it can be a dust collector of any conventional form.

The indexing unit 19 moves the parallel chains 15 intermittently a distance equal to the center to center spacing of the goods carriers 38, so that one of these carriers stops at the drilling station each time the chains are intermittently moved forward. This drilling of the goods, such as bread sticks 39 having had their upper end cut off, is done by a suitable drilling assembly 60, FIGS. 1 and 2. This drilling assembly utilizes a bracket 61 conventionally anchored on back panel 20. The front end of bracket 61 has conventionally anchored thereto in vertical position, a suitable motor 62 with a drill chuck 63 rotatably carried on the lower end of said motor, with a drill 64 of suitable size and length mounted in said drill chuck. This motor 62 is preferably adjustable up and down anchored in said bracket 61 in conventional manner, such as by means of set screws 65, so that the bread sticks 39 will be drilled to the proper depth for subsequent filling.

Spaced from the drilling station a suitable multiple of the spacings between the centers of carriers 38, is a filling assembly 66, FIGS. 1 and 2. This filling assembly utilizes a bracket 67 which carries on its outer end an adjustable delivery automatic commercial filler 68 of conventional construction which is diagrammatically shown and preferably positionable up and down, FIG. 2, and anchorable in any suitable manner such as by means of set screws 69. This filler 68 is provided on its lower end with a filler delivery tube 70, FIG. 11, of a suitable length and position to substantially reach the bottom of the drilled hole in the bread stick 39 when the latter is fully elevated by carrier 38. A switch means 71, FIG. 11, may be utilized so that when actuated by carrier 38, the dispensing of filling material 72 will start and automatically stop when the filler delivery tube 70 is almost withdrawn from the drilled hole in the bread stick 39. The filler 68 will preferably be provided with conventional safety members (not shown) which will prevent delivery of the filling material whenever there is no fillable item in carrier 38. This can be accomplished by tilting switch means 71, FIG. 11, toward filler delivery tube 70 so that by lightly contacting the upper end of the bread stick, the extrusion of filler material, such as comminuted high protein material, peanut butter, cheese, jam, preserves, and jelly into the bottom of the hollow bread stick 39 will start, but in absence of touching a bread stick at the bottom of its travel, feeding of filler material will not start.

In some cases it may be desirable to chill the filling material immediately after delivering it into the bread stick or the like, and especially the upper end of same. To accomplish this a refrigeration compartment 73, FIGS. 1, 2 and 4, may be utilized. The length of this compartment will depend, in the main, upon how much refrigeration of the filled item is desired and the showing is accordingly to be considered as diagrammatic of such equipment. One end of the refrigeration compartment, the operating connections of which are not shown, may be supported on bracket 25, FIG. 2, while the other end portion of same may be supported on a second bracket 74. The cam plate 47 may have a mounting end extension 75 conventionally anchorable to a bracket 76 which, in turn, may be mounted on the end of refrigeration compartment 73 as conventionally shown in FIGS. 2 and 4.

At the discharge end of the filling machine 10 there is preferably provided an arcuate side guard member 77, FIGS. 1 and 2, conventionally mounted on a support 78 carried on pedestal 12 which carries shaft 79 on which the double sprockets 14 are rotatably mounted. This side guard member 77 may be used to contact the rounded end 46 of shaft 45 to grip and hold goods 39 in carrier 38 until same is in position to be released into chute 83. In order to prevent the filled item or bread stick 39 from prematurely sliding out of carrier 38 as same is carried around sprocket 14, an alternate construction may be provided in the form of an arcuate end guard 80 having a mounting arm 81 fastened, preferably adjustably, on support 78 by means of a cap screw 82. This arcuate end guard terminates at the upper end of chute 83 so as to allow the filled bread stick 39 to slide endwise down the latter. This chute 83, as shown in FIG. 4, is fixedly anchored in place by cap screws 85 to the double pedestal 12 by means of supporting bracket 84, to which chute 83 may be conventionally joined as by welding, brazing, et cetera. While the apparatus has been described in terms of holding the goods 39 at the drilling and filling stations and again just before delivery into chute 83, this holding can be at all times except when carrier 38 is being loaded and when it is being emptied into chute 83, and it is intended that the drawings be considered as diagrammatically covering same.

The filled bread stick 39 sliding down chute 83 has its leading end, after the whole bread stick has left chute 83, come in contact with stop 86 which is supported on pedestal 87, the upper end of which, in turn has a bearing 88, FIG. 2, supporting the end of shaft 23 which carries sprocket 89 on which is carried a drive chain 90, FIGS. 2 and 4. The lower end of drive chain 90 passes around sprocket 91 fixedly mounted on shaft 92 which is carried by bearings 93 and 94 on pedestals 87 and 95, FIG. 1. Between pedestals 87 and 95 and anchored to shaft 92 is mounted a sprocket 112, FIG. 1, around which passes a conveyor belt 96, FIGS. 1 and 4, which preferably has a cross-grooved face to support the filled bread sticks crosswise of said conveyor belt in the position in which they are delivered to same. This conveyor belt at its other end passes over a second sprocket 97, FIGS. 1 and 2, mounted on a shaft 98 carried in bearings 99 and 100 of pedestals 101 and 102. At the delivery end of conveyor belt 96 there is provided a suitable receiver, for instance a pan 103, although for automatic packaging of the filled bread sticks this pan could have an open bottom and be the entrance to the packaging machine (not shown) hopper.

Instead of packaging full size filled bread sticks, they may be cut to bite size and bulk filled into suitable bags or other containers. To take care of producing this final form of the product, a suitable filled bread stick cutting apparatus 104 may be provided. In this case, FIGS. 1, 2 and 4, a pedestal 105 has mounted on its upper end a motor 106 having a shaft 107 extending across conveyor belt 96 and substantially parallel to same as shown. This shaft 107 has mounted thereon a series of circular cutting blades 108 spaced apart the length desired for the bite size pieces of the bread sticks. In this case the face of conveyor belt 96 would be provided with grooves 109 so that the blades 108 could cut through the filled bread sticks if completely severed pieces were desired. Wipers 110, FIG. 4, for the circular cutting blades 108 would preferably be used when the blades are adjusted to cut into the filling material in the filled bread sticks.

With the filling machine in full operation, the items to be filled, such as bread sticks, would be dropped in suitable manner into the carriers 38 at the right-hand end of the apparatus as seen in FIG. 2. The indexing unit 19 driven by motor 21, would through shaft 23 and shaft 26 driven by same through chain 30, intermittently elevate carriers 38 for the drilling and filling of the goods 39, while indexing unit 19 would operate the forwarding of carriers 38 for the timed processing of the bread sticks while carriers 38 are in lowered position.

When the bread sticks pass saw 56 the hard upper end of same is cut off ready for drilling the bread stick when the drilling station is reached. At this drilling point the conveyor having links 17 stops with a bread stick 39 in carrier 38. While carrier 38 is stopped, shaft 23 rotates and in turn slowly rotates cam shaft 26 on which cam 31, FIG. 10, is anchored. This cam 31 engages the bottom of carrier 38 and moves same up and back down to starting position during the stop interval. During this movement motor 62 is rotating drill 64 above the upper end of carrier 38. As the latter starts to rise the rounded outer end 46 of pin 45 engages the tapered lower end 48 of cam plate 47 to move arcuate member 44 carrying resilient member 52 inward to grip and hold the bread stick 39. Further movement of cam shaft 26 and cam 31 brings the cut end of the bread stick into contact with the end of drill 64 which passes into and back out of the bread stick ready for the carrier to move forward. While the end of the bread stick was being cut off and the drilling completed, the vacuum producing assembly 57 has been removing the sawdust and drilling through suction nozzle 59 which has been diagrammatically shown between the sawing and drilling stations.

At the same time the bread stick 39 was being drilled another carrier 38 was under filling assembly 66, FIGS. 9 and 11, where cam 32 mounted on shaft 26 simultaneously lifted this carrier 38 with the drilled bread stick 39 gripped in same to move the bread stick upward onto the filler delivery tube 70 which passes into the drilled opening of the bread stick substantially to the bottom of same where the filling mechanism is tripped with filling delivered into the bread stick as it moves downward with such delivery stopping substantially at the upper end of the bread stick. This so filled bread stick may then, if desired, be refrigerated on its way to the point where it is delivered ready for packaging either as whole filled bread sticks, or as bite size pieces after cutting by blades 108 on the way to the delivery point. From the above it is apparent that while one bread stick is being drilled another bread stick having a drilled opening is simultaneously being filled ready for forwarding and delivery.

A modified construction would use a wide stationary cam plate 47 with a turned-out end 113, FIGS. 1 and 2, which would engage the rounded end 46 of pin 45 so as to grip the goods 39 and hold same gripped continuously through the sawing, drilling, and filling operations so that there would be no rotation or shifting of the goods out of position from station to station.

Other modes of applying the principle of our invention may be employed instead of those explained, change being made as regards the product and apparatus herein disclosed, provided those stated by any of the following claims or their equivalent be employed.

We therefore particularly point out and distinctly claim as our invention:

1. An apparatus for producing a filled food item, which comprises a series of equally spaced carriers for the food item, means for moving said carriers along a continuous path, means for removing one end from said food item while in said carrier, means for removing an inner portion of said food item from the end of same which has been removed substantially to its other end to form a fillable cavity therein, and filling means having a nozzle for insertion into and filling said food item substantially from the bottom of said fillable cavity as said nozzle is being withdrawn therefrom.

2. An apparatus for producing a filled food item as set forth in claim 1, wherein said means for moving said carriers along a continuous path includes an indexing apparatus which moves said carriers with an intermittent forwarding motion between times of forming said cavity and filling such cavity in said food item.

3. An apparatus for producing a filled food item as set forth in claim 1, wherein there is an indexing means which intermittently forwards said carriers along a continuous path, and means adjacent said cavity forming means for alternately elevating and lowering one of said carriers, between forwarding movements, for the forming of said cavity in said food item carried by said carrier.

4. An apparatus for producing a filled food item as set forth in claim 1, wherein there is an indexing means which intermittently forwards said carriers along a continuous path, means adjacent said cavity forming means for alternately elevating and lowering one of said carriers, between forwarding movements, for the forming of said cavity in said food item carried by said carrier, means adjacent said filling means for alternately elevating and lowering one of said carriers which has just passed said cavity forming means, for the filling of said food item, and means actuating said filling means to fill said food item as said carrier is lowered, said alternate elevating and lowering of said carrier at said filling station being substantially simultaneous with the like movements of another carrier holding a similar food item while same is having said fillable cavity formed therein.

5. In an apparatus for producing an elongated manufactured food item which has been longitudinally drilled and filled, a means which resiliently grips and holds said food item while same is being drilled and filled, and means for actuating said gripping means.

References Cited

UNITED STATES PATENTS 3,139,043  6/1964  Reilly ............ 107—1 A
3,158,087  11/1964  Hedglin ............ 99—87
3,538,840  11/1970  Nelson ............ 99—88

PATRICK D. LAWSON, Primary Examiner